US009253606B2

(12) United States Patent
Modica et al.

(10) Patent No.: US 9,253,606 B2
(45) Date of Patent: Feb. 2, 2016

(54) STRUCTURE ACCESS CHARACTERISTICS DETERMINED FROM MOBILE UNIT DATA

(71) Applicant: Navteq B.V., Veldhoven (NL)

(72) Inventors: Leo Modica, Wheaton, IL (US); Leon Stenneth, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 147 days.

(21) Appl. No.: 13/784,120

(22) Filed: Mar. 4, 2013

(65) Prior Publication Data

US 2014/0248900 A1    Sep. 4, 2014

(51) Int. Cl.
| | |
|---|---|
| H04W 4/04 | (2009.01) |
| G01C 21/20 | (2006.01) |
| G01C 21/32 | (2006.01) |
| H04W 64/00 | (2009.01) |

(52) U.S. Cl.
CPC .............. *H04W 4/04* (2013.01); *G01C 21/206* (2013.01); *G01C 21/32* (2013.01); *H04W 64/006* (2013.01)

(58) Field of Classification Search
CPC ....... H04W 64/00; H04W 4/02; H04W 4/021; H04W 4/22; H04W 4/023; H04W 4/028; H04W 4/025; H04W 4/04; H04W 64/006; H04W 4/043; H04W 4/027; H04L 29/08657; G01S 5/0252; G01S 5/02; G01C 21/10; G01C 21/30; G01C 21/005; G01C 21/206
USPC .................................. 340/539.13; 455/456.1
See application file for complete search history.

(56) References Cited

U.S. PATENT DOCUMENTS

| | | | |
|---|---|---|---|
| 5,470,233 A | 11/1995 | Fruchterman et al. | |
| 6,005,548 A | 12/1999 | Latypov et al. | |
| 7,315,739 B2 | 1/2008 | Burch et al. | |
| 7,496,445 B2 | 2/2009 | Mohsini et al. | |
| 7,747,409 B2 | 6/2010 | Ladetto et al. | |
| 8,099,237 B2 | 1/2012 | Mays et al. | |
| 8,320,939 B1 | 11/2012 | Vincent | |
| 2010/0097214 A1 | 4/2010 | Sweeney et al. | |
| 2011/0121963 A1* | 5/2011 | Prehofer ................. | 340/539.13 |

(Continued)

FOREIGN PATENT DOCUMENTS

| | | |
|---|---|---|
| CN | 102667404 | 9/2012 |
| EP | 1081462 | 3/2001 |
| EP | 1256782 | 11/2002 |

(Continued)

OTHER PUBLICATIONS

Moustafa Alzantot et al: "CrowdInside", Advances in Geographic Information Systems, ACM, 2 Penn Plaza, Suite 701 New York NY 10121-0701 USA, Nov. 6, 2012, pp. 99-108, XP058010905, DOI: 10.1145/2424321.2424335 ISBN: 978-1-4503-1691-0.*

(Continued)

*Primary Examiner* — Magdi Elhag
(74) *Attorney, Agent, or Firm* — Lempia Summerfield Katz LLC

(57) ABSTRACT

In an embodiment, a system receives mobile device data from a plurality of mobile devices. The system compares the mobile device data with cartographic data representing a structure and determines a structure access characteristic based on the comparison. The structure access characteristic may be the location of an entrance or exit to the structure. The structure access characteristic may also be a structure access type, a structure access status, a structure access schedule, or any other structure access characteristic.

16 Claims, 10 Drawing Sheets

(56) References Cited

U.S. PATENT DOCUMENTS

2012/0136573 A1  5/2012  Janardhanan et al.
2012/0166147 A1  6/2012  Kwak et al.

FOREIGN PATENT DOCUMENTS

| EP | 2494309 | 9/2012 |
|---|---|---|
| TW | 201115111 | 5/2011 |
| TW | 201115118 | 5/2011 |
| TW | 201115119 | 5/2011 |
| TW | 201115172 | 5/2011 |
| TW | 201115498 | 5/2011 |
| TW | 201118345 | 6/2011 |
| TW | 201122866 | 7/2011 |
| TW | 201123024 | 7/2011 |
| TW | 201126139 | 8/2011 |
| WO | WO 2010/063904 | 6/2010 |
| WO | WO 2011/053335 | 5/2011 |
| WO | WO 2011/053336 | 5/2011 |
| WO | WO 2011/053337 | 5/2011 |
| WO | WO 2011/053338 | 5/2011 |
| WO | WO 2011/053339 | 5/2011 |
| WO | WO 2011/053340 | 5/2011 |
| WO | WO 2011/053380 | 5/2011 |
| WO | WO 2011/053389 | 5/2011 |
| WO | WO 2011/053391 | 5/2011 |
| WO | WO2012084003 A1 | 6/2012 |
| WO | WO 2012/162110 | 11/2012 |

OTHER PUBLICATIONS

He Wang et al., "Unsupervised Indoor Localization", Duke University, http://synrg.ee.duke.edu/papers/unloc-final.pdf, Jun. 25-29, 2012.

European Search Report and Written Opinion cited in EP14151546, mailed Jul. 14, 2014.

Moustafa Alzantot et al., CrowdInside: Automatic Construction of Indoor Floorplans, Nov. 6-9, 2012, ACM SIGSPATIAL GIS.

Communication Pursuant to Article 94(3) cited in EP14151546.0, mailed Aug. 18, 2015.

* cited by examiner

STRUCTURE ACCESS CHARACTERISTICS DETERMINED FROM MOBILE UNIT DATA

FIELD

The following disclosure relates to structure characteristic determinations, and more specifically to determining structure characteristics using mobile unit position and movement data.

BACKGROUND

Users of mobile devices often use the navigation capabilities of mobile devices for navigation purposes. This may include pedestrians who may need to be directed to an entrance of a building, or an operator of a vehicle who may need to be directed to an entrance to a structure such as a parking garage.

In mapping and navigation applications the locations and shapes of structures such as office buildings, amphitheaters, transit stations, parking garages and other facilities are often known, and matched to existing map data to display the structure along with other geographic features of a geographic area. Detailed features, however, are often not known for specific structures. For example, often the locations, sizes, and types of entrances and exits of structures cannot be determined from the basic cartographic data of a structure.

Traditional methods such as manually charting structure features can be very costly if applied on a large scale. For example, manually charting the features of the majority of the structures in a large city would require significant resources.

SUMMARY

In an embodiment, building entrances and exits are determined using pedestrian mobile device data. Specifically, the existence of building entrances, the location of building entrances, the width of building entrances, and/or the type of building entrances may be determined. Also, operational periods of building entrances and exits may be determined.

In another embodiment, a method is provided for receiving mobile device data from a plurality of mobile devices, comparing the mobile device data with cartographic data of a structure, and determining a structure access characteristic based on the comparison. The comparing may comprise applying a clustering analysis to the mobile device data to locate mobile device data clusters, and the structure access location may be an entrance or an exit of a structure. Additionally, the structure access location may be determined from an analysis of a located data cluster.

An access location may be a location of an entrance or an exit to a structure. A structure may be a building, a parking garage, an amphitheater, or any other type of facility having access characteristics.

A structure access characteristic may also be a structure access type. A structure access type may be a revolving door, a swinging door, a recessed door, an unobstructed access, or any other type of structure access.

A spatial banding scheme may be applied to mobile device data to develop spatially banded mobile device data. Further, a machine learning algorithm may be applied to spatially banded or non-spatially banded mobile device data to recognize patterns in the mobile device data. These patterns may be used to determine structure access characteristics.

A structure access characteristic may be a structure access status. A structure access status may be determined from a comparison between historical data and recently received mobile device data. A structure access status may be active, inactive, or any other description of the status of a structure access.

A structure access characteristic may also be a structure access schedule. A structure access schedule may be determined from an analysis of densities of mobile device data received from a geographic area. The densities of mobile device data may be associated with a time of day, a day of the week, or a time of year. The densities of mobile device data may be received from a geographic area containing a structure access location. The structure access schedule may include the hours of operation of the structure, or an organization associated with the structure.

In another embodiment, a non-transitory computer readable medium includes instructions that are operable to receive mobile device data from a plurality of mobile devices, compare the mobile device data with cartographic data of a structure, and determine an access characteristic of the structure as a function of the comparison.

In another embodiment, an apparatus includes a memory configured to store structural data representing the geographic boundaries of a structure and mobile device data representing locations and movements of a plurality of mobile devices. The apparatus also includes a controller configured to determine an access characteristic of the structure based on a comparison of the structural data and the mobile device data.

BRIEF DESCRIPTION OF THE DRAWINGS

Exemplary embodiments of the present invention are described herein with reference to the following drawings.

DETAILED DESCRIPTION

Figure 1:
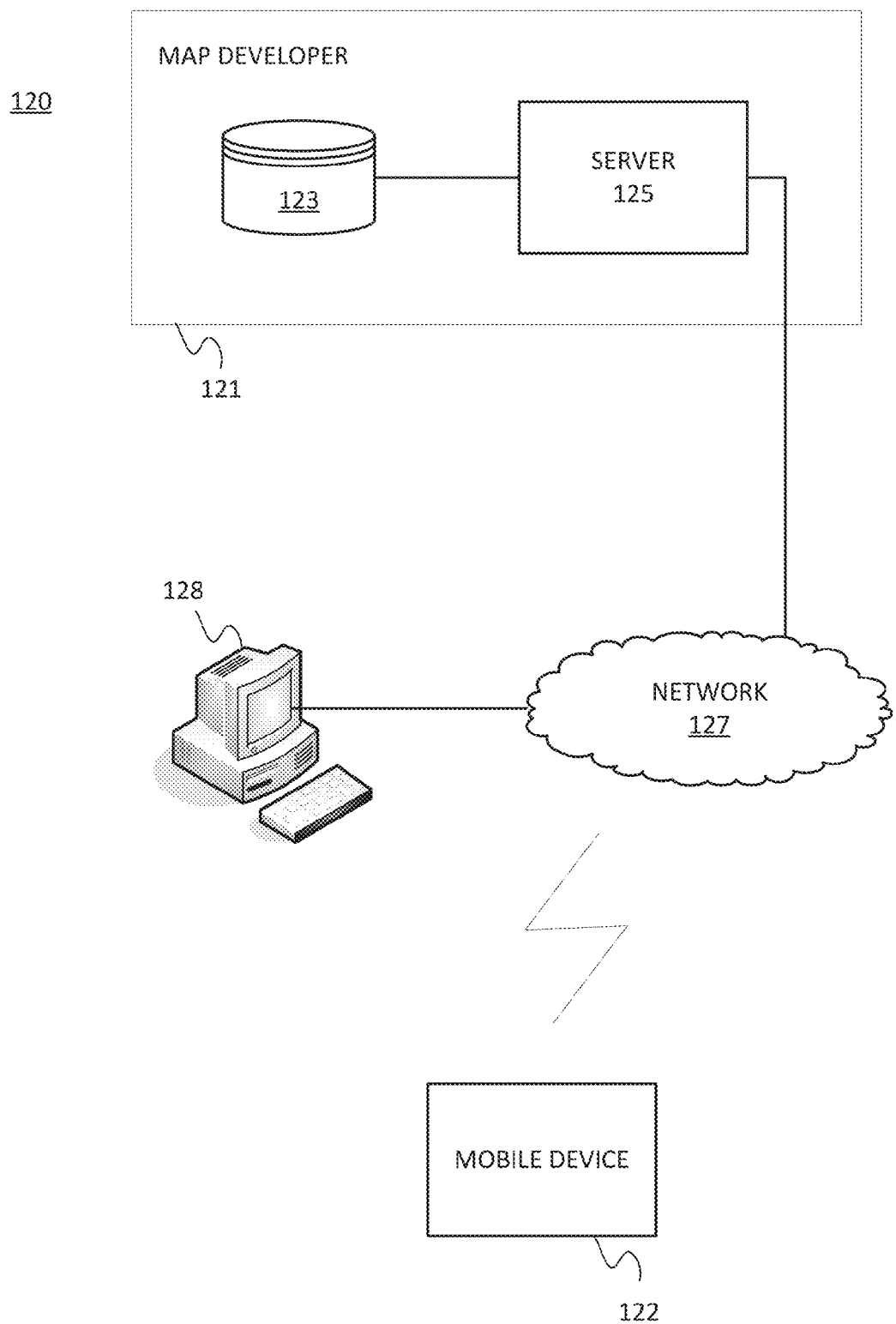
FIG. 1 illustrates an exemplary mapping or navigation system.

FIG. 1 illustrates an exemplary mapping or navigation system 120. The mapping and navigation system 120 includes a map developer system 121, a mobile device 122, and a network 127. Additional, different, or fewer components may be provided. For example, many mobile devices 122 may connect with the network 127.

The developer system 121 includes a server 125 and a database 123. The developer system 121 may include computer systems and networks of a system operator such as NAVTEQ or Nokia Corporation. The geographic database 123 may be partially or completely stored in the mobile device 122.

The developer system 121 and the mobile device 122 are coupled with the network 127. The phrase "coupled with" is defined to mean directly connected to or indirectly connected through one or more intermediate components. Such intermediate components may include hardware and/or software-based components.

The database 123 includes geographic data used for navigation-related applications. The geographic data may include data representing a road network including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structure cartographic data or pedestrian routes. Geographic data may be used to determine structure access characteristics.

The mobile device 122 includes one or more detectors or sensors as a positioning system built or embedded into or within the interior of the mobile device 122. Alternatively, the mobile device 122 uses communications signals for position determination. The mobile device 122 receives location data from the positioning system. The server 125 may receive sensor data configured to describe a position of a mobile device, or a controller of the mobile device 122 may receive the sensor data from the positioning system of the mobile device 122. The mobile device 122 may also include a system for tracking mobile device movement, such as rotation or acceleration. Movement information may also be determined using the positioning system.

The mobile device 122 may communicate location and movement information via the network 127 to the server 125. The server 125 may use the location and movement information received from the mobile device 122 to associate the mobile device 122 with a geographic region described in the geographic database 123. Server 125 may also associate the mobile device 122 with a geographic region manually.

The server 125 may receive location and movement information from multiple mobile devices 122 over the network 127. The location and movement information may be in the form of mobile device data. The server 124 may compare the mobile device data with cartographic data of a structure stored in the database 123. The server 125 may determine a structure access characteristic based on the comparison of the mobile device data with cartographic data of a structure. The structure access characteristic may be a characteristic of the structure that has cartographic data stored in the database 123. The structure may be a building, and the structure access characteristic may be the location of an entrance or exit of the building.

The computing resources for determining a structure access characteristic may be divided between the server 125 and the mobile device 122. In some embodiments, the server 125 performs a majority of the processing. In other embodiments, the mobile device 122 performs a majority of the processing. In addition, the processing is divided substantially evenly between the server 125 and the mobile device 122.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 2:
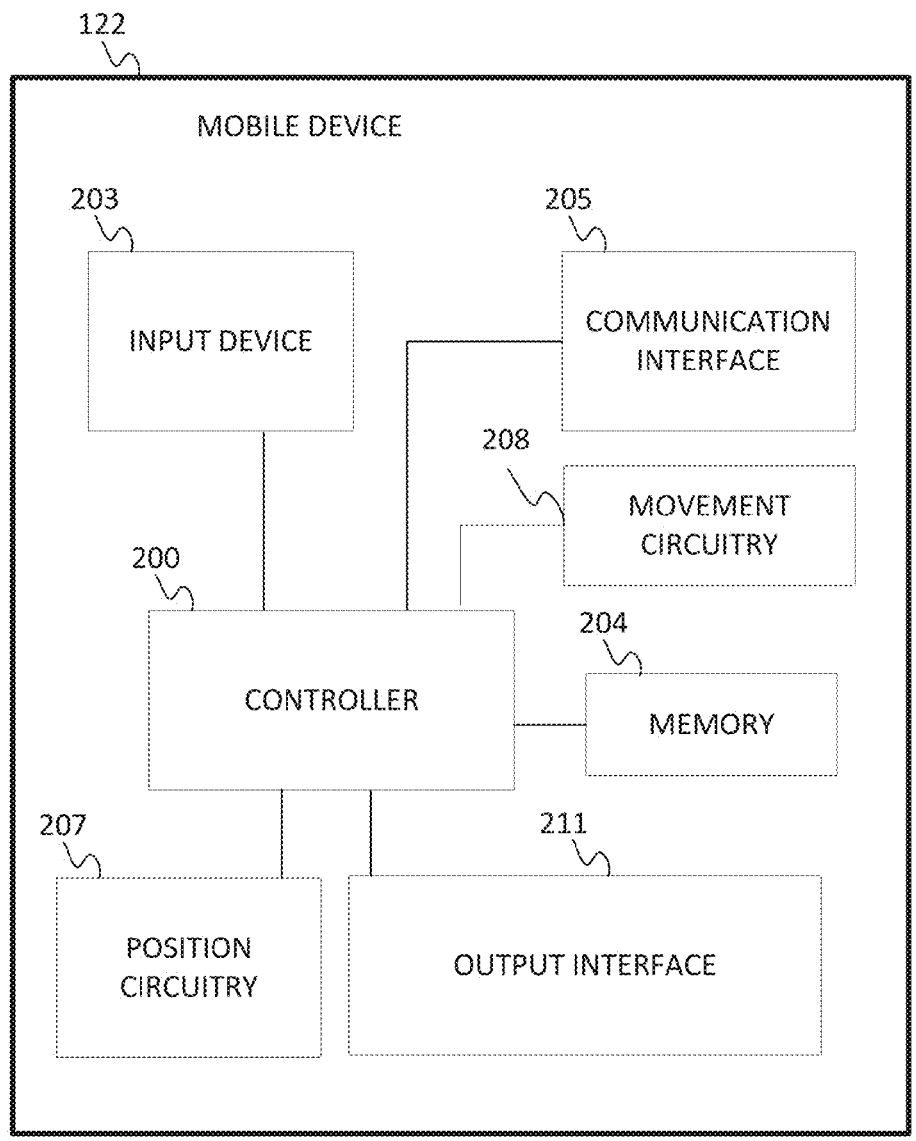
FIG. 2 illustrates an exemplary mobile device of the mapping or navigation system of FIG. 1.

FIG. 2 illustrates an exemplary mobile device of the mapping or navigation system of FIG. 1. The mobile device 122 may be referred to as a navigation device. The mobile device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the mobile device 122. The mobile device 122 is a smart phone, a mobile phone, a personal digital assistant (PDA), a tablet computer, a notebook computer, a personal navigation device (PND), a portable navigation device, and/or any other known or later developed mobile device. The positioning circuitry 207, which is an example of a positioning system, is configured to determine a geographic position of the mobile device 122. The movement circuitry 208, which is an example a movement tracking system, is configured to determine movement of a mobile device 122. The position circuitry 207 and the movement circuitry 208 may be separate systems, or segments of the same positioning or movement circuitry system.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The movement circuitry 208 may include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device. The movement circuitry 208 may be used alone, or with the positioning circuitry 207 to determine mobile device 122 movement.

The input device 203 may be one or more buttons, keypad, keyboard, mouse, stylist pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

The communication interface 205 is configured to send mobile device movement and position data to a server 125. The movement and position data sent to the server 125 may be used to determine a structure access characteristic. The communication interface 205 may also be configured to receive data indicative of a determined access characteristic of a structure. The position circuitry 207 is configured to determine the current location of the mobile device. The controller 200 may be configured to determine a structure access characteristic. The controller 200 may also be configured to determine directions to a structure access location. The output interface 211 may be configured to present the structure access characteristic to a user of the mobile device 122. The output interface 211 may also be configured to present directions to a structure access location.

Figure 3:
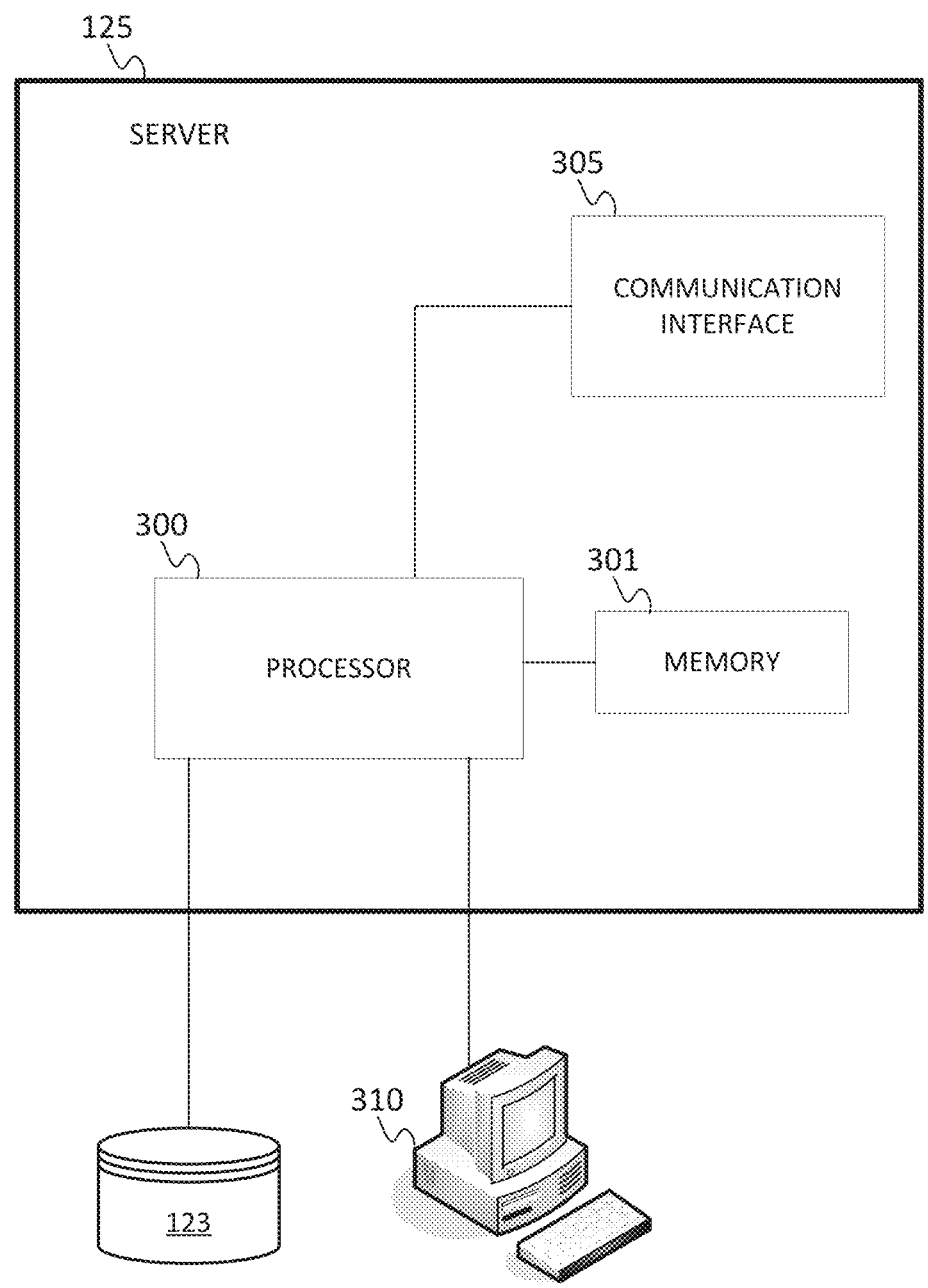
FIG. 3 illustrates an exemplary server of the mapping or navigation system of FIG. 1.

FIG. 3 illustrates an exemplary server of the mapping or navigation system of FIG. 1. The server 125 includes a processor 300, a communication interface 305, and a memory 301. The server 125 may be coupled to a database 123 and a workstation 310. The database 123 may be a geographic database. The workstation 310 may be used as an input device for the server 125. In addition, the communication interface 305 is an input device for the server 125. The communication interface 305 receives data indicative of use inputs made via the mobile device 122.

The communication interface 305 is configured to receive mobile device data representing locations and movements of a plurality of mobile devices 122. The memory 301 may also store structural data representing the geographic boundaries of a structure. The processor 300 is configured to determine an access characteristic of a structure based on a comparison of the mobile device data and the structural data.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

Figure 4:
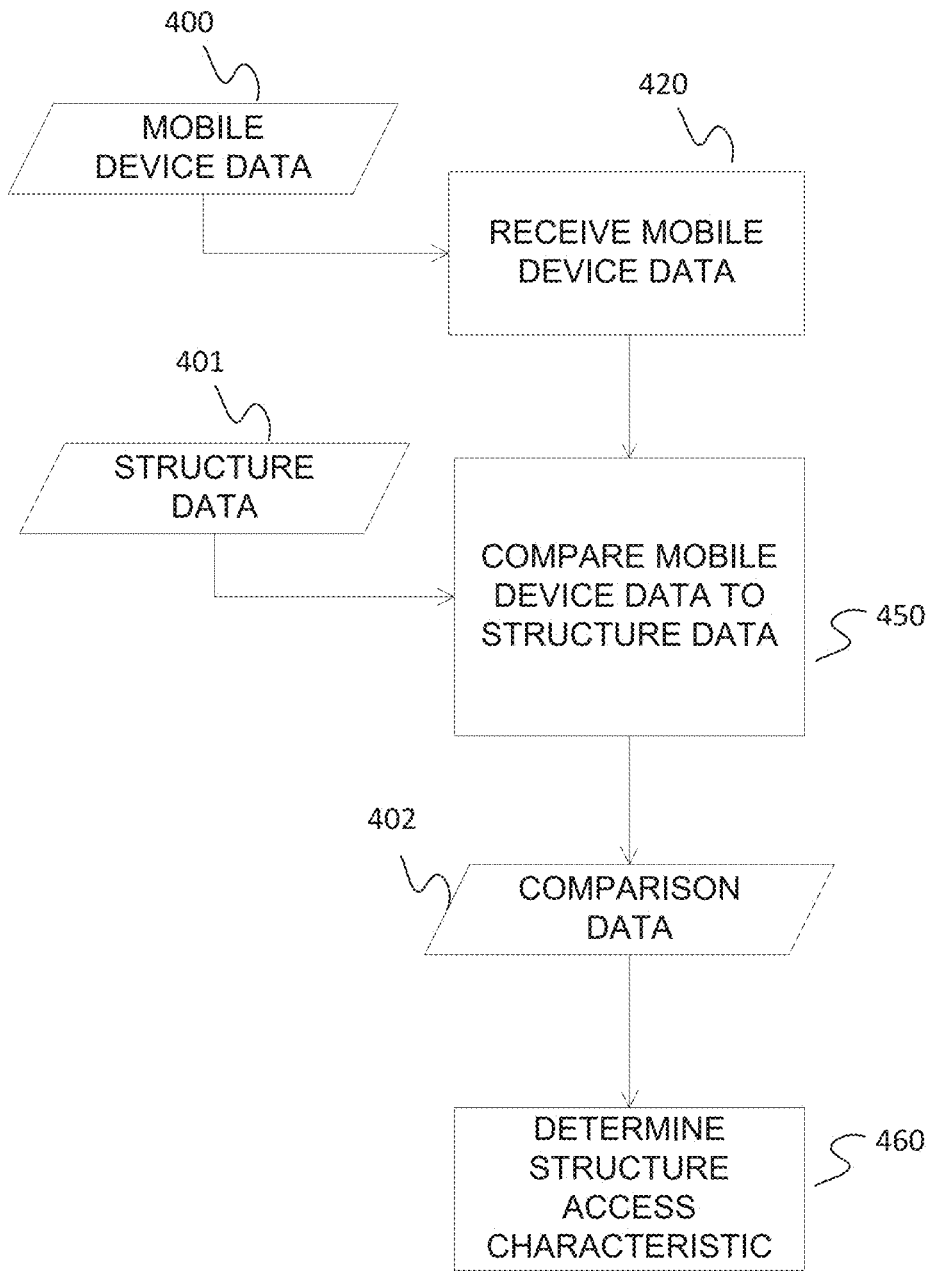
FIG. 4 illustrates an example flowchart for determining structure access characteristics.

FIG. 4 illustrates an example flowchart for determining structure access characteristics. As presented in the following sections, the term controller may refer to either controller 200 or processor 300 and the following acts may be performed by mobile device 122, server 125, or a combination thereof. Additional, different, or fewer acts may be provided. The acts are performed in the order shown or other orders. The acts may also be repeated.

At act 420 mobile device data 400 is received. The mobile device data 400 may be received from a plurality of mobile devices. The mobile device data 400 may be received over a period of time. The mobile device data 400 may be position data or movement data. The mobile device data 400 may also include spatial data, temporal data, motion data, audio data, or any other form of data that may be generated by a mobile device. Position data can be determined using any localization technique, including Global Positioning System (GPS) localization techniques. Movement data may be determined using any movement detection or measurement technique. The mobile device data 400 may be received from a mobile device in use by a pedestrian. The mobile device may also be associated with mechanized transport such as an automobile or a bicycle. The location information and movement information may be received from any capable device including a mobile device as described herein.

At act 450 mobile device data 400 is compared to structure data 401. The mobile device data 400 and structure data 401 may both represent the same geographic area. The comparison between the mobile device data 400 and the structure data may produce comparison data 402 that includes elements of both the structure data 401 and mobile device data 400.

The structure data 401 may be cartographic data describing geometrical features of a structure. The structure data 401 may represent the geographic boundaries of a structure. A structure may be a building, an amphitheater, a transit station, a parking garage or any other facility. A structure may have a defined perimeter that has specific locations designated as access locations where access is provided to the interior of the structure. A structure may also have an associated schedule of when the interior of the structure is accessible.

The comparison data 402 may be a combination of the structure data 401 and the mobile device data 400. The comparison data 402 may also only include segments or elements of the mobile device data 400 and the structure data 401. The comparison data 402 may be a new set of data, created from the comparison of the mobile device data 400 and the structure data 401. The comparison data 402 may include all of the mobile device data 400 and structure data 401 for a geographic area surrounding a structure.

At act 460, a structure access characteristic is determined. The structure access characteristic may be determined using the comparison data 402. A structure access characteristic may be a structure access location, a structure access size, a structure access type, a structure access schedule, or any other characteristic relating to access of a structure.

The structure access characteristic may be determined using any method. For example, data clustering and/or machine learning algorithms may be used. The structure access characteristic may also be determined manually, based on the comparison at act 450.

Figure 5:
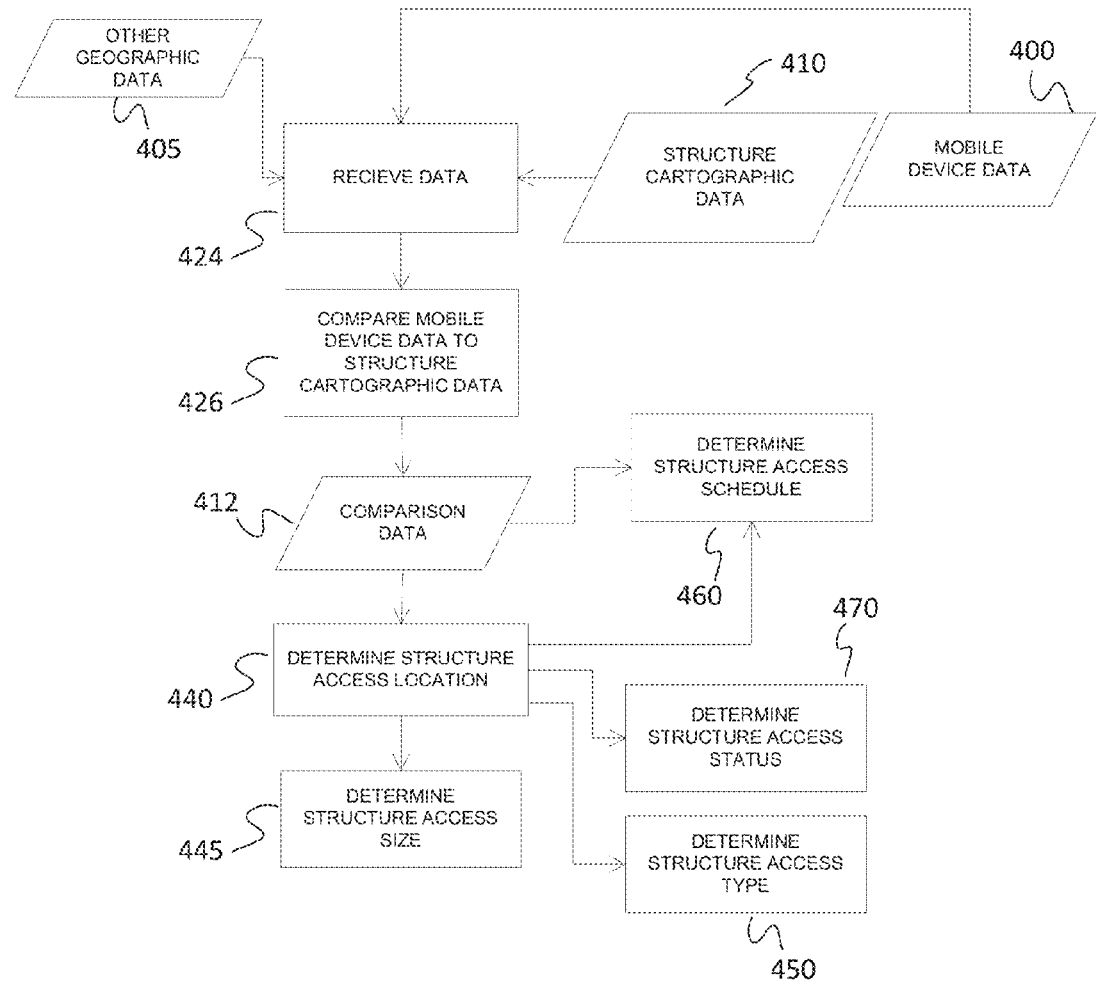
FIG. 5 illustrates another example flowchart for determining structure access characteristics.

FIG. 5 illustrates another example flowchart for determining structure access characteristics.

At act 424 structure cartographic data 410 and mobile device data 400 is received. The mobile device data 400 may be data from multiple mobile devices, and acquired over a period of time. The mobile device data 400 may be stored or accumulated prior or after act 424. The mobile device data 400 may include position and movement data for a mobile device. The position and movement data may be correlated such that the location of the acquisition of the movement data is associated with the movement data. The mobile device data may also associate a time that the position and movement data is recorded.

The structure cartographic data 410 may be manually entered or automatically determined. The structure cartographic data may represent a building, a park, an outdoor venue, or any other type of facility. The cartographic data may represent a facility that includes a building surrounded by an access barrier such as a wall. The structure cartographic data 410 may include geographic details or parameters of a structure. The structure cartographic data 410 may also indicate a polygon or an outline of a perimeter of a structure assigned to cartographic coordinates.

Other geographic data 405 may also be received. Other geographic data 405 may include pedestrian paths, vehicle roadways, topography data, or data relating to other geographic features. The other geographic data may be cartographic data that defines a geographic region or area. A defined geographic area may provide reference or correlating coordinates for the structure cartographic data 410 and the mobile device data 400.

At act 426 structure cartographic data 410 and mobile device data 400 are compared. Comparison data 412 may be created from the comparison of the structure cartographic data 410 and the mobile device data 400. The comparison may be facilitated by the correlating cartographic coordinates for a geographic area contained in the other geographic data 405. The mobile device data 400 and the structure cartographic data 410 may correlate to the same geographic area. The comparison data 426 may represent the correlated data of the geographic area.

At act 440 structure access locations are determined. Structure access locations may be entrances or exits to structures. Structure access locations may be determined based on an analysis of the comparison data 412. The analysis may be performed by any known method. For example machine learning algorithms may be applied to the comparison data 412 to determine structure access locations.

Machine learning is generally involves the construction and study of systems that can learn from presented data and data examples. Machine learning may develop operational relationships between sets of data. Machine learning algorithms may be implemented in software programs configured to run on a computer. Machine learning algorithms may be provided an example, or training, set of data that implies a relationship or correlation of the data. If a machine learning algorithm is presented with multiple training sets of data the machine learning algorithm may generalize a set of relationships from the training data sets that may imply a shared characteristic of the data points included in the data sets. The machine learned algorithm may apply these learned sets of relationships to new or different sets of data to classify or qualify the sets of data based on indicated characteristics. Some machine learning algorithms may attempt to eliminate the need for human intuition in data analysis, while others may adopt a collaborative approach between human and machine.

Machine learning algorithms may be applied to determine structure access characteristics. For example, mobile device data 400 may be pedestrian data. Since there are typically a limited number of access locations for structures, pedestrians generally accumulate in the same area outside of a structure access location. Since many of these pedestrians carry mobile devices, the accumulation of pedestrians in the vicinity of a structure access location can result in the existence of mobile device data clusters. Because of this, determining a structure access location 440 may be performed through a machine learning algorithm designed for data cluster determination.

Data cluster determination may be manual or automatic. An automatic cluster determination may be performed by any known, or yet to be determined, cluster determination technique. Data cluster determination may be performed by assigning a set of data into subsets, or clusters, such that the data within the same cluster is similar according to some characteristic. In the case of structure access characteristic determination, an embodiment can designate that geographic proximity to other mobile data points is a shared characteristic of a subset or cluster. In this way geographic areas may have clusters of mobile device data 400. These data clusters may be located proximate to a perimeter of a structure indicated in the structure cartographic data 410. The proximate location of data clusters may also be a characteristic for cluster determination.

Multiple data clusters may also be determined for a geographic area, and data clusters may be determined as a function of sub-clusters. The temporal properties of the mobile device data 400 may also be clustered. Also, multiple data clusters representing the same geographic area, but separated temporally, may be used for cluster determination, and cluster characteristic determination. The number of clusters may be determined apriori and considered as input to a clustering algorithm, or the number of clusters may be determined by a clustering algorithm.

Techniques and models such as connectivity models, centroid models, distribution models, density models, subspace models, group models, or graph-based models may be used for cluster determination.

Once a data cluster is determined, a perpendicular line extending from the center of the cluster and intersecting with a structure cartographic wall or point may indicate the location of a structure access. The intersection may also indicate the center of the structure access. The center of a cluster may be determined by any known, or yet to be determined method, including weighted averages of the cartographic points associated with the individual data points of the determined cluster. The center of the cluster may also be the geometric center of the cluster.

In act 445 a structure access size is determined. The edges of a cluster may indicate the edges of a structure access location. Once the edges of a structure access location are determined, a size of the structure access can be determined. In other embodiments multiple clusters may be used. For example, the largest maximum distance (e.g. Euclidian distance) between cluster centroids can also be considered in a structure access size determination.

At act 450 a structure access type may be determined. A structure access type may include a revolving door, a swinging door, a recessed door, an unobstructed access, or any other type of structure access. A structure access type can be determined based on the behavior of pedestrians as they approach a structure access location. Pedestrians approaching a revolving door behave differently than pedestrians approaching a swinging door. This different behavior leads to different types of position and movement data collected from the mobile devices carried or associated with the pedestrians. An analysis of the movement and position data can lead to a determination of a structure entrance type. The analysis may be performed by any analytical method that may indicate a correlation between data and a structure entrance type. Machine learning algorithms may be applied to mobile device data to determine a structure access type. For example, a machine learning algorithm may be provided sets of mobile device data that have been correlated to a structure access type to determine identifying characteristics shared by the sets of mobile device data. The machine learned algorithm may then be applied to other sets of mobile device data to determine if the other sets of mobile device data share the identifying characteristics, thus determining if any of the other data sets may also be correlated with a structure access type.

In an embodiment, a subset of structure data may have a determined structure access type. Collected mobile device data (e.g. motion data, position data, temporal data, or audio data) may be manually or automatically associated with this structure access type. This collected mobile device data may then be used to train a machine learning model. Subsequently, for another subset of structure access data, the structure type may be determined automatically via machine learning utilizing only mobile device data.

In various embodiments, any machine learning algorithm may be used. For example, decision tree learning, random forest, k-nearest neighbor, association rule learning, artificial neural networks, genetic programming, inductive logic programming, support vector machines, clustering, Bayesian networks, reinforcement learning, representation learning, similarity and metric learning, or sparse dictionary learning may be used.

Also, the analysis may indicate mobile device data patterns that may be associated with structure access types. Spatial banding schemes may be used to analyze the mobile device data to determine the associated patterns.

At act 460 a structure access schedule may be determined. The structure access schedule may be determined from an analysis of a plurality of densities of mobile device data received from a geographic area shared by a structure. The structure access schedule may determine the plurality of densities of mobile device data using the comparison data 412. The geographic area may include a structure access location. The plurality of densities may each be associated with a time of day, a day of the week, or a time of year. A relative traffic flow may be determined using the associated plurality of densities. From this association a schedule of access usage may be developed. This structure access schedule may be indicative of the hours of operation of the structure, or an organization associated with the structure.

At act 470 a structure access status may be determined. A structure access status may be determined from a comparison between historical data and recently received mobile device data. If historical data indicates that there is a structure access location, but there is no recently acquired pedestrian data indicating a current structure access, this may indicate that the structure access location is inactive. Similarly, if a structure access location continues to have pedestrian data indicating that the structure access location is in use, the structure access status may be active.

Figure 6:
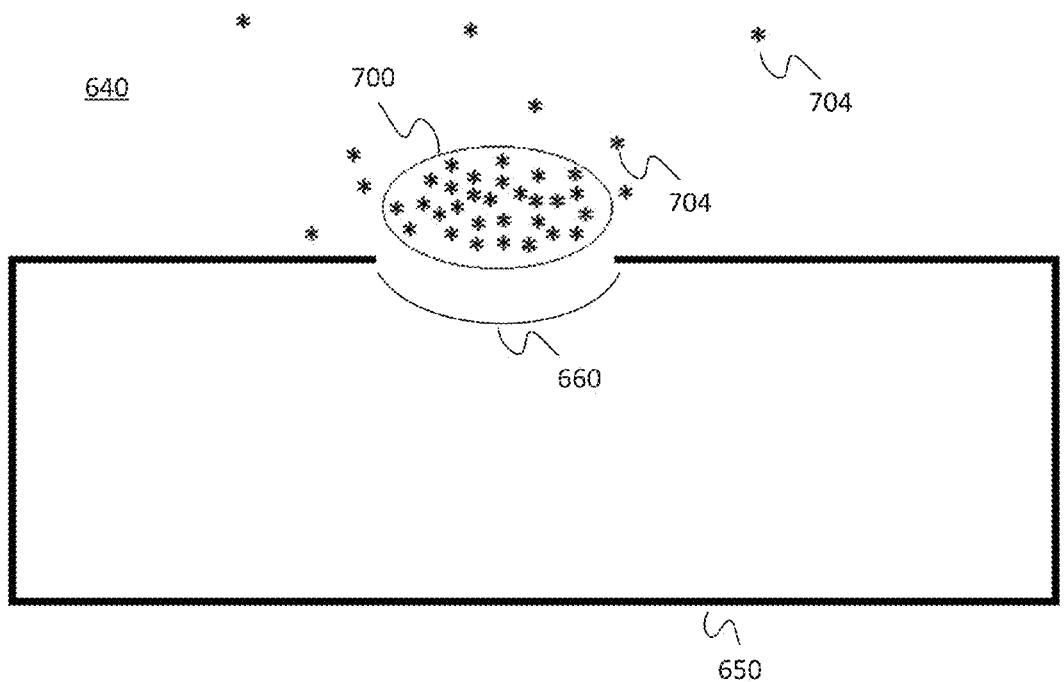
FIG. 6 illustrates an example data cluster.

FIG. 6 illustrates an example data cluster. Cartographic data indicating a structure perimeter 650 is shown with multiple mobile device data points 704 sharing a geographic area 640. A mobile data cluster 700 is formed on the exterior of the structure perimeter 650. The mobile data cluster 700 may be determined manually or automatically. Any known, or yet to be determined, technique for data cluster determination may be used. The mobile data cluster 700 may be determined using a machine learned algorithm that may identify a density of mobile device data 704 in the geographic area 640. The density of the mobile device data 704 may vary throughout the geographic area 640. Sub-areas within the geographic area 640 with a higher mobile data density may be determined to be a data cluster 700. The proximity of the mobile device data 704 to the structure perimeter 650 may also be a characteristic used to determine a data cluster. The data cluster 700 may be any size or shape. The mobile data cluster 700 implicates the existence of structure access location 660.

Figure 7:
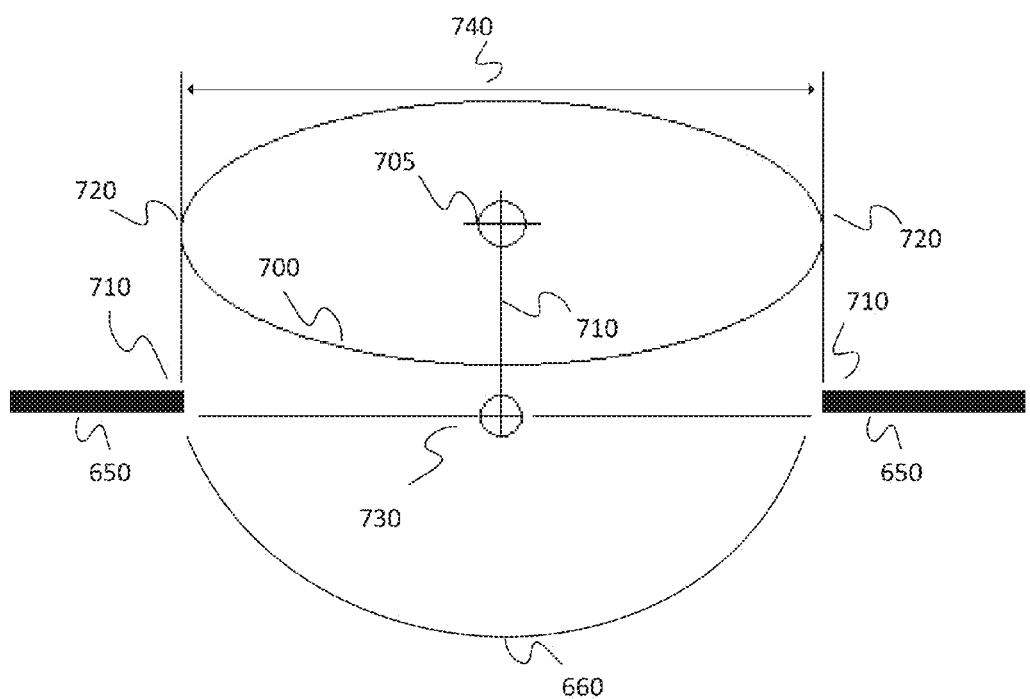
FIG. 7 illustrates an example determination of structure access characteristics from the data cluster of FIG. 6.

FIG. 7 illustrates an example determination of structure access characteristics. Data cluster 700 has a center 705. The center 705 is determined using any method such as weighted average of cluster data points, or a pure geometrical center of the data cluster 700. A perpendicular line 710 extends from the data cluster center 705 and intersects with a structure perimeter 650 at structure access center 730, thus indicating structure access location 660. The data cluster 700 may have an edge 720 that indicates a structure access location edge 710. Using the structure access edge 650 and the structure access center 730 a structure access size 740 may be determined. The structure access size 740 may be a width of the structure access location 660. In another embodiment, multiple data clusters 700 are accumulated over time and analyzed. Then a distance is measured between the centroids of the most distant clusters that span the structure access 660. Structure access locations 660 that are narrow, such as a single door, may have associated data clusters 700 that are narrower. In contrast, structure access locations 660 that are wide, such as a double door or a recessed door, may have data clusters 700 that are wider.

Figure 8:
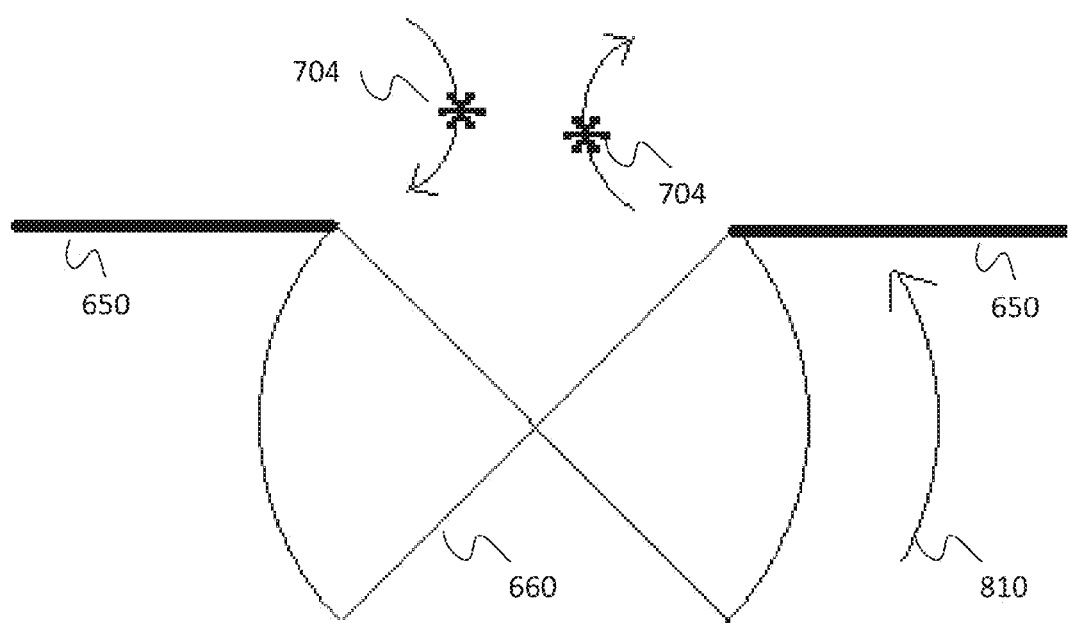
FIG. 8 illustrates an example of a structure access type determination.

FIG. 8 illustrates an example of a structure access type determination. Mobile device data 704 may have included movement components such as rotation. These movement components may indicate a structure access type for structure access location 660 of structure perimeter 650. These indications may be considered a signature of the motion exhibited by a pedestrian as the pedestrian approaches or leaves a structure. For example, mobile device data 704 may indicate that structure access location has a revolving door structure access type. Also, the mobile device data may indicate a direction of rotation 810 of the revolving door. Signatures of motion may be determined using machine learning algorithms. Different structure access types may have different signatures of motion.

Figure 9:
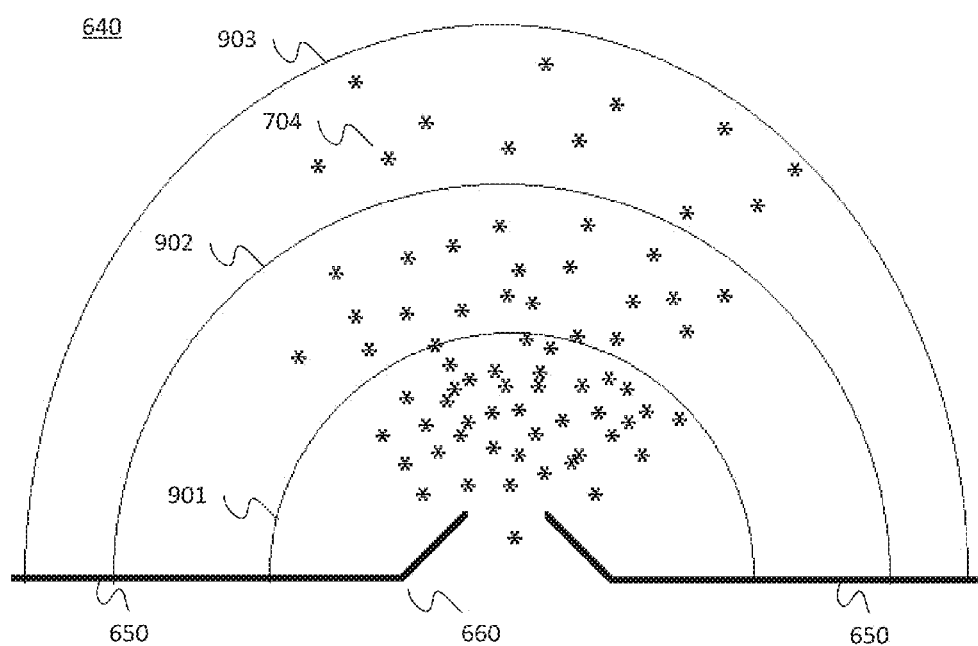
FIG. 9 illustrates an example of spatial banding.

FIG. 9 illustrates an example of spatial banding. Structure access location 660 of structure perimeter 650 has a plurality of mobile device data 704 sharing a geographic area 640. Spatial bands 901, 902, and 903 define sub-areas of geographic area 640. Mobile data densities may be determined for these sub-areas by counting the number of mobile data points 704 that exist in a sub-area. These mobile data densities for the sub-areas may be considered a signature of delay. These signatures of delay may indicate a structure access type such as a swinging, sliding, or rotating door. Different types of structure access types may have different spatial banded densities, or signatures of delay. In FIG. 9, the different densities for the sub-areas correlating to the spatial bands are a result of pedestrians slowing down to open the swinging door, or waiting for the swinging door to open. As this mobile device data would be collected over time, more data points would be collected from sub-areas where the pedestrian was moving more slowly. For example, the variance in densities through the bands may be less dramatic if the structure access type was an automatic sliding door or an unobstructed access. Mobile data 704 may have other characteristics that distinguish automatic sliding door and manual door structure access types. For example, the signature of motion that may be associated with an automatic sliding door may indicate that a pedestrian only hesitates slightly as there is only a slight reduction in the mobile device data 704 velocity. In contrast, a pedestrian approaching a manually operated door may need to slow down considerably to open the door. This may be reflected in a signature of motion that indicates a mobile device with a determined velocity that is considerably slowed as the mobile device data 704 is taken closer to the door.

Any structure access type may have associated signatures of delay and signatures of motion. The structure access types may also be characterized by a combination of the signatures of delay and the signatures of motion.

Figure 10:
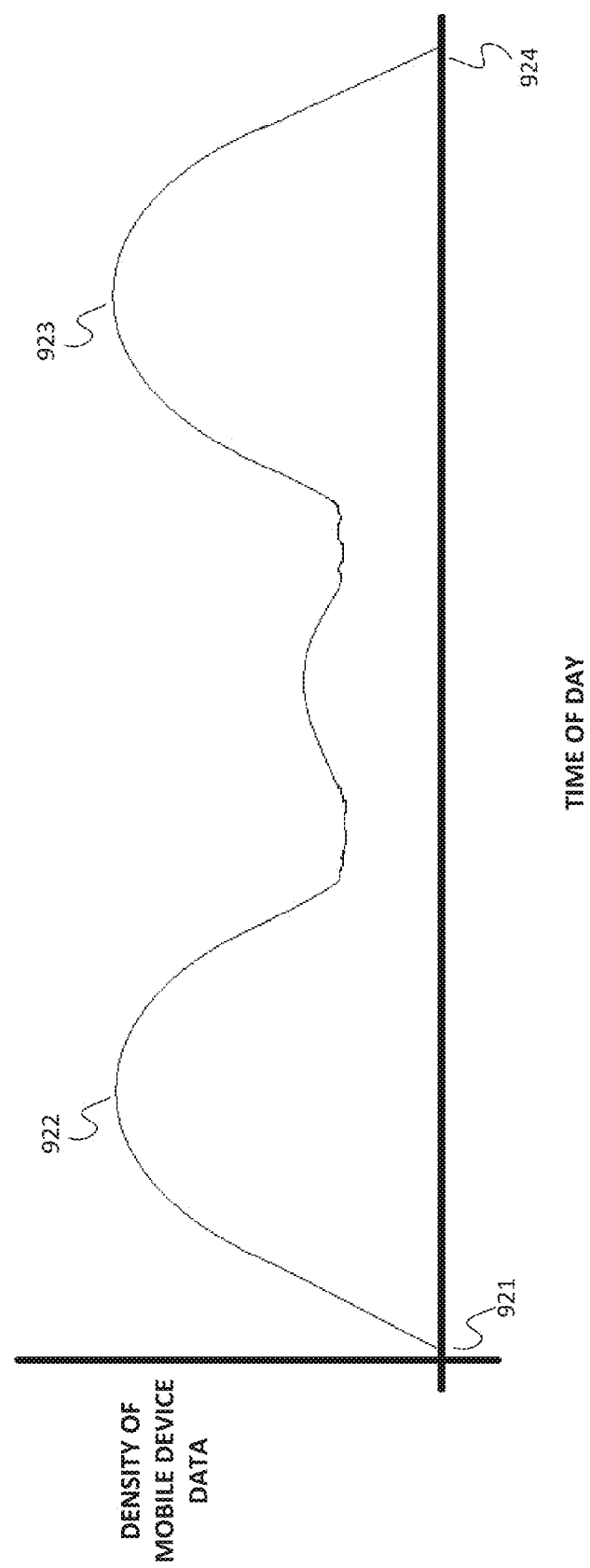
FIG. 10 illustrates an example of a structure access schedule.

FIG. 10 illustrates an example of a structure access schedule. Mobile data density for a geographic area containing a structure is charted temporally verses time of day to determine a relative traffic flow. A relative traffic flow may also be determined by counting the number of determined clusters in a geographic area, and grouping them temporally. The relative traffic flow may tend to dissipate prior to and after a structure opens access locations. Also, prior to and after a structure opens mobile data clusters tend to not form. From this type of analysis a structure access opening time 921 and a structure access closing time 924 may be determined. Morning peak access times 922 and afternoon peak access times 923 may also be determined. This schedule may indicate the hours of operation of the structure, or an organization associated with the structure.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
receiving mobile device data from a plurality of mobile devices located in an outdoor geographic area external to a structure;
comparing, with a controller, the mobile device data with data representing the structure to create comparison data; and
determining a structure access characteristic based on the comparison data and based on applying a machine learning algorithm to the mobile device data to determine patterns of mobile device data indicating the structure access characteristic,
wherein the access characteristic comprises a type of the structure access, the access type comprises a revolving door a swinging door, or a recessed door.

2. The method of claim 1, wherein the comparing comprises applying a clustering analysis to the mobile device data to locate data clusters, wherein the structure access characteristic comprises a location of an entrance or an exit of the structure, and wherein the location is determined from an analysis of a located data cluster.

3. The method of claim 2, wherein the structure access characteristic further comprises a size of the entrance or the exit of the structure, and the size is determined using any combination of an access center or an access edge determined from the analysis of the located data cluster.

4. The method of claim 2, wherein the structure is a building, an amphitheater, a park, or a multi-building facility.

5. The method of claim 1, wherein the comparing further comprises:
determining a spatial banding scheme; and
associating the mobile device data with the spatial banding scheme to create spatially banded mobile device data,
wherein applying the machine learning algorithm comprises:
applying the machine learning algorithm to the spatially banded mobile device data.

6. The method of claim 1, wherein the access characteristic comprises a structure access status determined from a comparison between historical data and the mobile device data.

7. The method of claim 6, wherein the structure access status is active or inactive.

8. The method of claim 1, wherein the access characteristic comprises a structure access schedule determined from an analysis of a plurality of densities of mobile device data received from a geographic area, wherein the plurality of densities are associated with a time of day.

9. The method of claim 8, wherein the structure access schedule comprises hours of operation for the structure or an organization associated with the structure.

10. A non-transitory computer readable medium including instructions executable by a processor to:
receive mobile device data from a plurality of mobile devices located in an outdoor geographic area surrounding a structure;
compare the mobile device data with cartographic data of the structure; and
determine an access characteristic of the structure as a function of the comparison and based on applying a machine learning algorithm to the mobile device data to determine patterns of mobile device data indicating the access characteristic of the structure,
wherein the access characteristic comprises a type of the structure access, the access type comprises a revolving door a swinging door, or a recessed door.

11. The non-transitory computer readable medium of claim 10, wherein the instructions are further operable to:
determine the existence of a data cluster having a cluster center;
wherein the access characteristic comprises an access location and a center of the access location determined using the cluster center.

12. The non-transitory computer readable medium of claim 11, wherein the access location is a location of an entrance or a location of an exit of the structure.

13. The non-transitory computer readable medium of claim 12, wherein the entrance or the exit further comprise a size determined from an analysis of the data cluster.

14. The non-transitory computer readable medium of claim 11, wherein the access characteristic further comprises an access schedule determined from an analysis of a plurality of densities of mobile device data received from a geographic area comprising the access location, wherein the plurality of densities are associated with a time of day.

15. An apparatus comprising:
a memory configured to store structural data representing external geographic boundaries of a structure, and mobile device data representing locations and movements of a plurality of mobile devices external to the geographic boundaries; and
a processor configured to determine an access characteristic of the structure based on a comparison of the structural data and the mobile device data, the comparison based on machine learning algorithm applied to the mobile device data to determine patterns of mobile device data indicating the access characteristic of the structure,
wherein the access characteristic comprises a size and type of the structure access, the access type comprises a revolving door a swinging door, or a recessed door.

16. The apparatus of claim 15, wherein the access characteristic further comprises the location of an access to the structure.

* * * * *